United States Patent
Tanaka (10) Patent No.: US 9,329,687 B2
(45) Date of Patent: May 3, 2016

(54) TOUCH PANEL DEVICE HAVING VIBRATION FUNCTION

(71) Applicant: KYOCERA DOCUMENT SOLUTIONS INC., Osaka (JP)

(72) Inventor: Yoko Tanaka, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 7 days.

(21) Appl. No.: 14/142,509

(22) Filed: Dec. 27, 2013

(65) Prior Publication Data

US 2014/0184545 A1  Jul. 3, 2014

(30) Foreign Application Priority Data

Dec. 28, 2012 (JP) ................. 2012-287081

(51) Int. Cl.
*G06F 3/01* (2006.01)
*G03G 15/00* (2006.01)

(52) U.S. Cl.
CPC ............ *G06F 3/016* (2013.01); *G03G 15/5016* (2013.01)

(58) Field of Classification Search
CPC .............................. G06F 3/016; G06F 3/04812
See application file for complete search history.

(56) References Cited

U.S. PATENT DOCUMENTS

| 2011/0115709 A1* | 5/2011 | Cruz-Hernandez ..... G06F 3/016 345/168 |
| 2011/0115734 A1* | 5/2011 | Harashima et al. ........... 345/173 |
| 2011/0210926 A1* | 9/2011 | Pasquero ................ G06F 3/016 345/173 |
| 2012/0075221 A1* | 3/2012 | Yasuda ......................... 345/173 |

FOREIGN PATENT DOCUMENTS

JP  2005-258666 A  9/2005

* cited by examiner

*Primary Examiner* — Sanghyuk Park
(74) *Attorney, Agent, or Firm* — Studebaker & Brackett PC (57) ABSTRACT

A touch panel device includes a touch panel, a first displacement section, and a second displacement section. The first displacement section is in contact with a reserve surface of the touch panel and displaces the touch panel in a direction perpendicular to a plane of the touch panel based on a first drive signal. The second displacement section is in contact with the reverse surface of the touch panel at a location close to a location where the first displacement section is in contact with the reverse surface of the touch panel and displaces the touch panel in the direction perpendicular to a plane of the touch panel based on a second drive signal.

6 Claims, 7 Drawing Sheets

First vibration pattern

FIG. 6A

Second vibration pattern

TOUCH PANEL DEVICE HAVING VIBRATION FUNCTION

INCORPORATION BY REFERENCE

The present application claims priority under 35 U.S.C. §119 to Japanese Patent Application No. 2012-287081, filed Dec. 28, 2012. The contents of this application are incorporated herein by reference in their entirety.

BACKGROUND

The present disclosure relates to touch panel devices.

Recently, a technique called force feedback has been proposed in which feeling of pressing an operation key is fed back as tactile feeling to the operator in touch panel devices including a touch panel arranged on a display. Some touch panel devices, which is provided with a touch panel including piezoelectric elements, feed back tactile feeling to an operator in a manner that drive signals are applied to the piezoelectric elements to vibrate the touch panel upon operator's touch with the operation surface of the touch panel.

SUMMARY

A touch panel device in the present disclosure includes a touch panel, a first displacement section, and a second displacement section. The first displacement section is in contact with a reserve surface of the touch panel and displaces the touch panel in a direction perpendicular to a plane of the touch panel based on a first drive signal. The second displacement section is in contact with the reverse surface of the touch panel at a location close to a location where the first displacement section is in contact with the reverse surface of the touch panel, and displaces the touch panel in the direction perpendicular to the plane of the touch panel based on a second drive signal.

DETAILED DESCRIPTION

Figure 1:
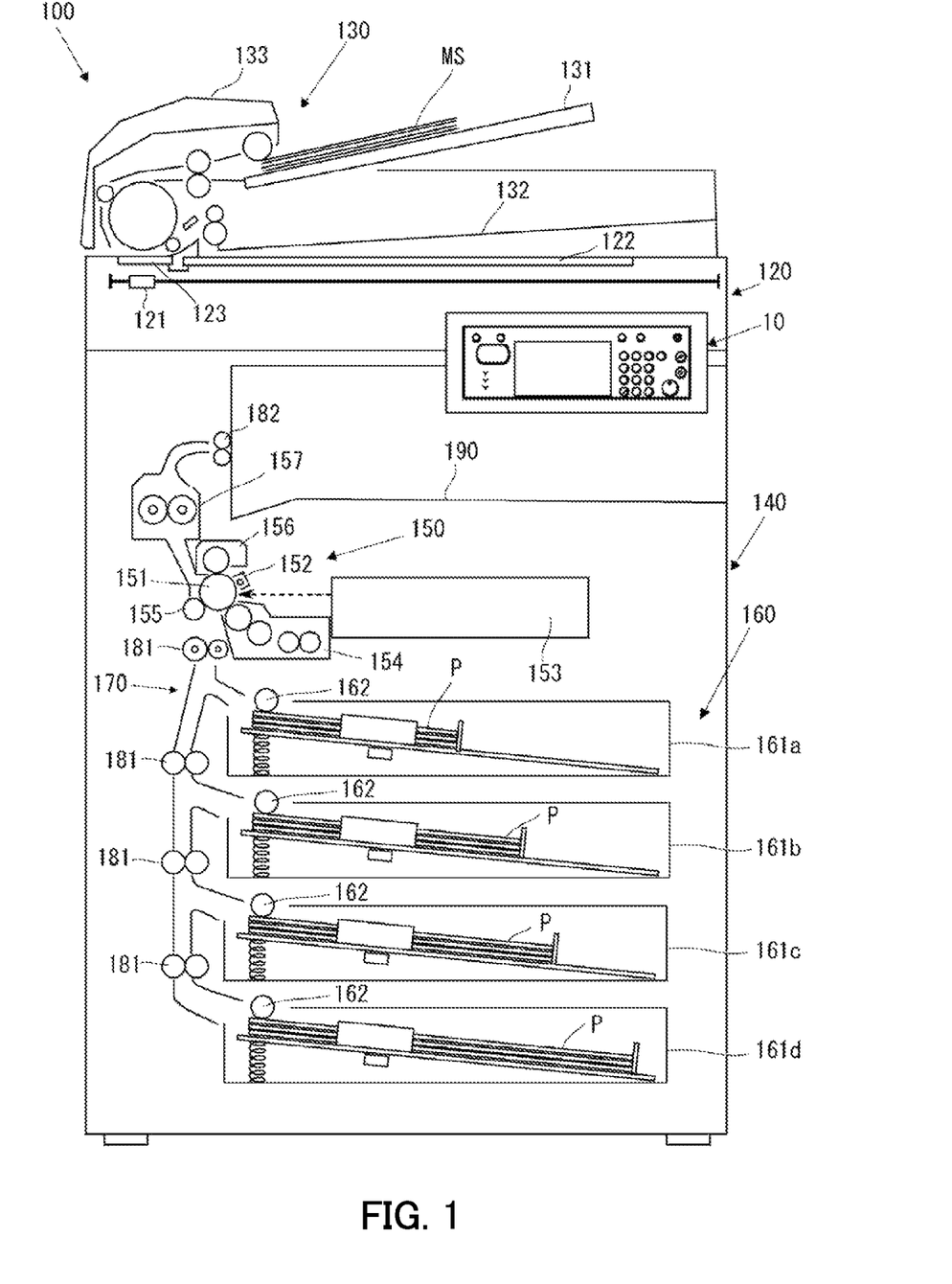
FIG. 1 is a configuration diagram showing one example of an image forming apparatus including a touch panel device according to one embodiment.

An embodiment of the present disclosure will be described in detail below with reference to the accompanying drawings. An image forming apparatus 100 including a touch panel device 10 according to the present embodiment is a copier. As shown in FIG. 1, the image forming apparatus 100 includes a document reading section 120, a document feeder 130, and a recording section 140. The document reading section 120 is arranged above the recording section 140. The document feeder 130 is arranged above the document reading section 120. It is noted that the image forming apparatus 100 will be described as a copier in the present embedment, but can be a scanner, a multifunction peripheral, or the like.

Figure 2:
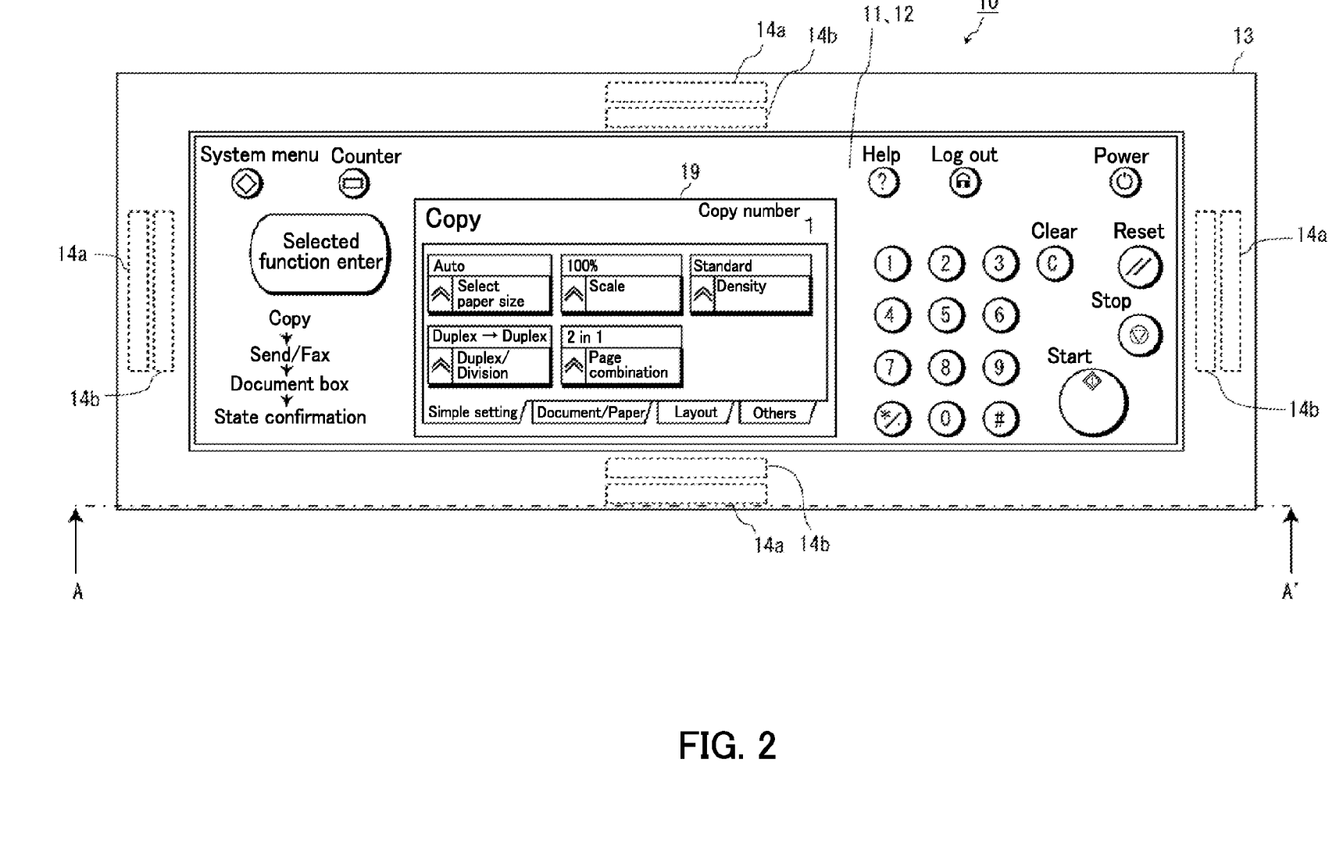
FIG. 2 is a configuration diagram showing one example of the touch panel device according to the embodiment.
Figure 3:
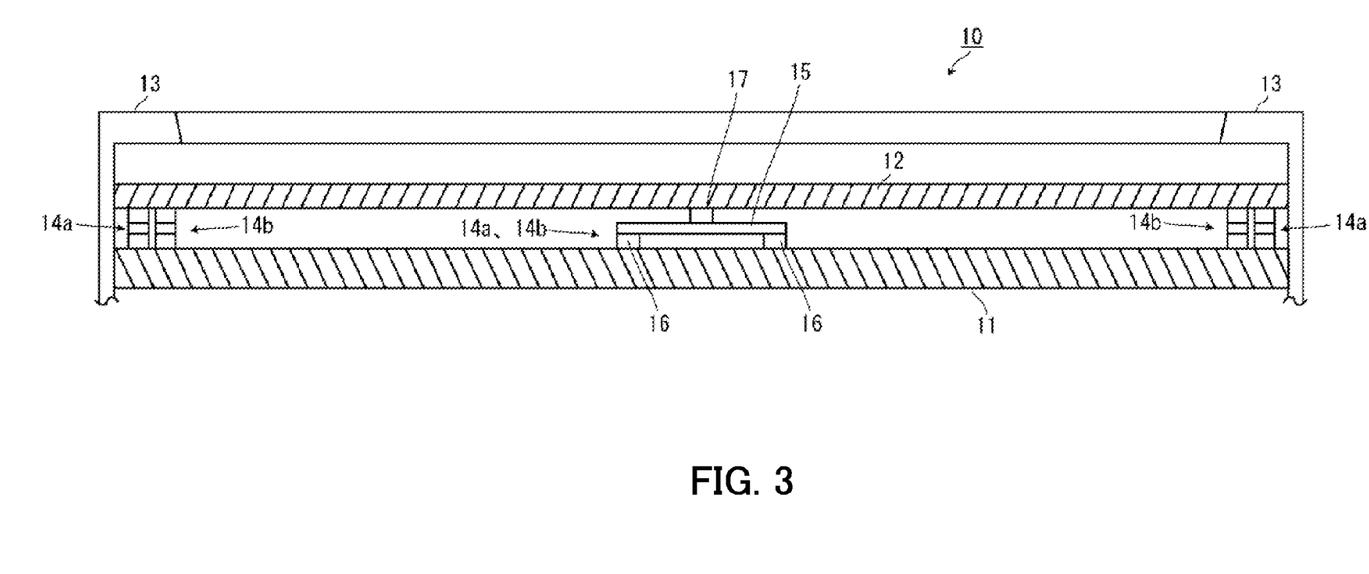
FIG. 3 is a cross sectional view taken along the line A-A' in FIG. 2.

The touch panel device 10 is arranged on the front surface of the image forming apparatus 100. The touch panel device 10 is used for inputting setting or operation instructions to the image forming apparatus 100. As shown in FIGS. 2 and 3, the touch panel device 10 includes a display 11 and a touch panel 12. The display 11 displays various types of operation keys to receive input by manipulation. The touch panel 12 is provided on the display surface of the display 11. The touch panel 12 receives operation corresponding to an operation key displayed on the display 11 in a manner to detect input by pressing by operator's fingertip, a stylus, or the like and then to output a signal corresponding to the position at which the input is detected. A liquid crystal display panel can be used as the display 11, for example. Further, the touch panel 12 of resistive type, electrostatic capacitive type, and the like can be used as the touch panel 12, for example. In the present embodiment, the touch panel 12 is used which is slightly bent (deformed) in response to pressure force upon being pressed.

As shown in FIG. 3, for example, the display 11 is accommodated in and held by a casing 13. The touch panel 12 is arranged above the display 11. Further, an upper cover is provided on the casing 13 so as to cover the surrounding region of the display 11 and the touch panel 12. In one example, first piezoelectric elements 14a and second piezoelectric elements 14b are provided on the reverse surface of the touch panel 12 at locations covered with the upper cover. The first and second piezoelectric elements 14a and 14b each function as a displacement section to displace the touch panel 12 in a direction perpendicular to the plane of the touch panel 12. Each of the first and second piezoelectric elements 14a and 14b includes a strip-shaped piezoelectric diaphragm 15, a pair of support members 16 to support the piezoelectric diaphragm 15 from the opposite ends of the piezoelectric diaphragm 15, and a contact member 17 provided at the central part of the piezoelectric diaphragm 15 so as to be in contact with the reverse surface of the touch panel 12. The first piezoelectric elements 14a and the second piezoelectric elements 14b are arranged in pairs so that the locations where the contact members 17 of the first and second piezoelectric elements 14a and 14b are in contact with the reverse surface of the touch panel 12 are close to each other in each pair. In the present embodiment, four pairs of the first and second piezoelectric elements 14a and 14b are arranged at the central parts of the respective sides of the rectangular touch panel 12. It is noted that the number and the arrangement locations of the pairs of the first and second piezoelectric elements 14a and 14b can be appropriately selected.

Figure 4A:
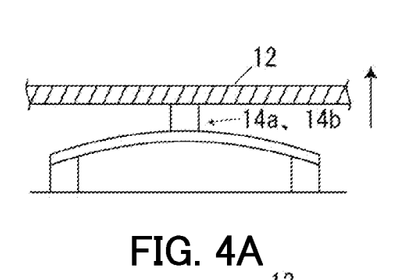
FIG. 4A is an illustration showing a first displacement state of piezoelectric elements according to the embodiment.
Figure 4B:
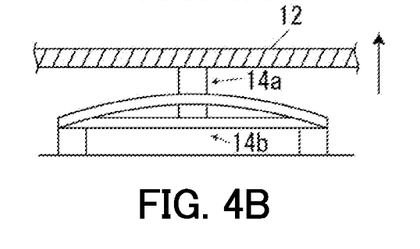
FIG. 4B is an illustration showing a second displacement state of the piezoelectric elements according to the embodiment.
Figure 4C:
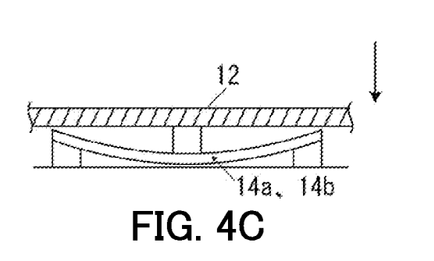
FIG. 4C is an illustration showing a third displacement state of the piezoelectric elements according to the embodiment.
Figure 4D:
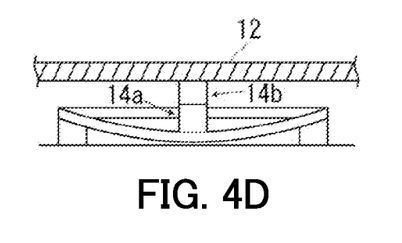
FIG. 4D is an illustration showing a fourth displacement state of the piezoelectric elements according to the embodiment.

As shown in FIGS. 4A-4D, the first and second piezoelectric elements 14a and 14b bend the corresponding piezoelectric diaphragms 15 in a direction close to or away from the reverse surface of the touch panel 12 in response to drive signals applied thereto, thereby displacing the touch panel 12 in the direction perpendicular to the plane of the touch panel 12. FIG. 4A shows a state in which the piezoelectric diaphragms 15 of both of a first piezoelectric element 14*a* and a second piezoelectric element 14*b* in one pair are bent in the direction close to the reverse surface of the touch panel 12. In this case, the first and second piezoelectric elements 14*a* and 14*b* press up the touch panel 12 in the direction indicated by the arrow. FIG. 4B shows a state in which the piezoelectric diaphragm 15 of only the first piezoelectric element 14*a* is bent in the direction close to the reverse surface of the touch panel 12. In this case, the first piezoelectric element 14*a* presses up the touch panel 12 in the direction indicated by the arrow. It is noted that the first and second piezoelectric elements 14*a* and 14*b* (contact members 17) are not fixed to and are separable from the reverse surface of the touch panel 12. FIG. 4C shows a state in which the piezoelectric diaphragms 15 of both the first and second piezoelectric elements 14*a* and 14*b* are bent in the direction away from the reverse surface of the touch panel 12. In this case, the touch panel 12 is pressed down in the direction indicated by the arrow by manipulation pressure by an operator's finger or its own weight. FIG. 4D shows a state in which only the piezoelectric diaphragm 15 of the first piezoelectric element 14*a* is bent in the direction away from the reverse surface of the touch panel 12. In this case, the touch panel 12 is supported by the second piezoelectric element 14*b* with no displacement in the perpendicular direction.

As shown in FIG. 2, the touch panel device 10 includes operation keys, such as a numeric keypad, a reset key, a stop key, a start key, etc. The numeric keypad is used for inputting numerical values, such as the number of copies, etc. The reset key is used for inputting an instruction to initialize the setting information. The stop key is used for stopping a copying operation or deleting a numerical value input. The start key is used for inputting an output instruction to start the copying operation.

As shown in FIG. 1, the document reading section 120 includes a scanner 121, a platen glass 122, and a document reading slit 123. The scanner 121 is made up of a light emitting diode (LED), a charge coupled device (CCD) sensor, etc. The scanner 121 is movable in a conveyance direction of an original document MS in which the document feeder 130 conveys. The platen glass 122 is a document table made of a transparent member, such as glass, or the like. The document reading slit 123 is a slit formed in a direction orthogonal to the conveyance direction of the original document MS in which the document feeder 130 conveys.

In order to read an original document MS placed on the platen glass 122, the scanner 121 moves to the position that faces the platen glass 122 and reads the original document MS placed on the platen glass 122 while scanning the original document MS, thereby obtaining image data of the original document MS. Then, the scanner 121 outputs the obtained image data to the recording section 140. Alternatively, in order to read an original document MS conveyed by the document feeder 130, the scanner 121 moves to the position that faces the document reading slit 123 and reads the original document MS through the document reading slit 123 in synchronization with conveyance of the original document MS by the document feeder 130, thereby obtaining image data of the original document MS. Then, the scanner 121 outputs the obtained image data to the recording section 140.

The document feeder 130 includes a document loading section 131, a document ejection section 132, and a document conveyance mechanism 133. The document conveyance mechanism 133 feeds out an original document MS loaded on the document loading section 131 on a sheet-by-sheet basis and conveys the original document MS to the position that faces the document reading slit 123 of the document reading section 120. Thereafter, the original document MS is ejected to the document ejection section 132. It is noted that the document feeder 130 is tiltable. In other words, when the document feeder 130 is lifted upward, the top of the platen glass 122 is opened.

The recording section 140 includes an image forming section 150, a paper feeder 160, a conveyance path 170, conveyance rollers 181, an ejection roller 182, and an exit tray 190.

The paper feeder 160 includes a plurality of paper feed cassettes 161*a*-161*d* to accommodate recording paper P and paper feed rollers 162 to feed out the recording paper P from the corresponding paper feed cassettes 161*a*-161*d* to the conveyance path 170 on a paper-by-paper basis. The paper feed rollers 162, the conveyance rollers 181, and the ejection roller 182 cooperate to function as a conveyance section to convey recording paper P. Each conveyance roller 181 conveys recording paper P, which has been fed out by the corresponding paper feed roller 162 to the conveyance path 170, to the image forming section 150. Then, the ejection roller 182 ejects the recording paper P, which is subjected to recording by the image forming section 150, outside the apparatus. The recording paper P subjected to recording is guided to the ejection roller 182 and is ejected onto the exit tray 190.

The image forming section 150 includes a photosensitive drum 151, a charger 152, an exposure section 153, a development section 154, a transfer section 155, a cleaning section 156, and a fixing section 157. The exposure section 153 is an optical unit including a laser device, a mirror, etc. The exposure section 153 outputs laser light based on image data to expose the photosensitive drum 151, which is charged, to form an electrostatic latent image on the surface of the photosensitive drum 151. The development section 154 is a development unit to develop the electrostatic latent image formed on the photosensitive drum 151 with the use of toner. The development section 154 forms a toner image based on the electrostatic latent image on the photosensitive drum 151. The transfer section 155 transfers the toner image formed on the photosensitive drum 151 by the development section 154 to recording paper P. The cleaning section 156 removes toner remaining on the photosensitive drum 151 after transfer. The fixing section 157 heats the recording paper P, to which the toner image has been transferred by the transfer section 155, to fix the toner image to the recording paper P.

Next, one example of a hardware configuration of the image forming apparatus 100 will be described with reference to FIG. 5.

The touch panel device 10, the document reading section 120, the document feeder 130, the image forming section 150, and the conveyance section (the paper feed rollers 162, the conveyance rollers 181, the ejection roller 182) of the image forming apparatus 100 are connected to a controller 1. The controller 1 controls the operation of them. Further, a storage section 2 and an image processing section 3 are connected to the controller 1.

The controller 1 is an information processing section of a microcomputer or the like including a read only memory (ROM), a random access memory (RAM), etc. The ROM stores a control program for controlling the operation of the image forming apparatus 100. The controller 1 reads the control program stored in the ROM and loads the read control program onto the RAM. Then, the controller 1 executes the loaded control program to control the entire apparatus according to predetermined instruction information, etc. input through the touch panel device 10.

The storage section 2 is a storage section, such as a semiconductor memory, a hard disk drive (HDD), or the like. The storage section 2 stores image data obtained by reading an original document by the document reading section 120.

The image processing section 3 performs predetermined image processing on image data. The image processing section 3 performs scaling and image enhancement processing, such as density adjustment, tone adjustment, etc., for example.

Figure 5:
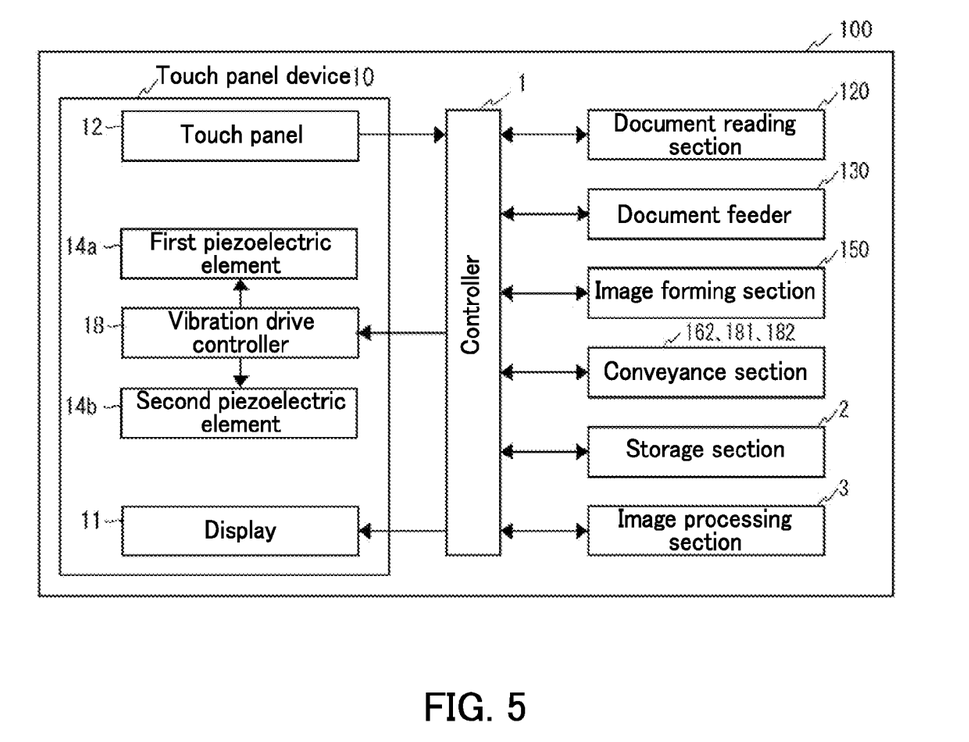
FIG. 5 is a block diagram showing a schematic configuration of the image forming apparatus according to the embodiment.

As shown in FIG. 5, the touch panel device 10 is provided with a vibration drive controller 18 which drives the first and second piezoelectric elements 14a and 14b based on an instruction from the controller 1. The vibration drive controller 18 can apply drive signals to the first and second piezoelectric elements 14a and 14b to bend the corresponding piezoelectric diaphragms 15, thereby displacing the touch panel 12 in the direction perpendicular to the plane of the touch panel 12. Each drive signal is a periodic signal of a sine wave signal, or the like. The vibration drive controller 18 applies drive signals with the same wavelength and amplitude to the first and second piezoelectric elements 14a and 14b. The vibration drive controller 18 applies a drive signal to either the first piezoelectric elements 14a or the second piezoelectric elements 14b. Or, the vibration drive controller 18 applies drive signals to them with their phases shifted. Thus, the touch panel 12 is displaced according to a plurality of vibration patterns shown as examples in FIGS. 6A, 6B, 7A, and 7B.

Figure 6A:
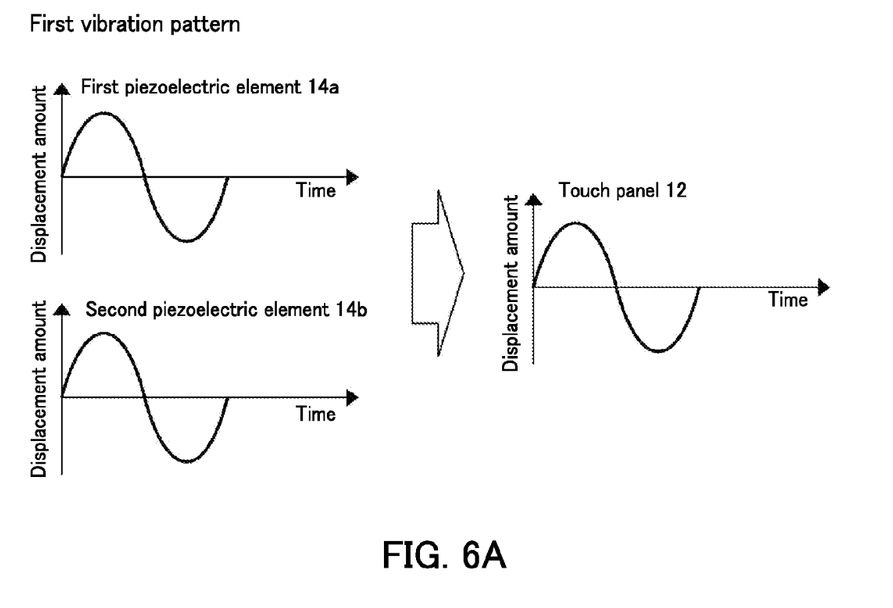
FIG. 6A is an illustration showing a first vibration pattern of the touch panel according to the embodiment.

FIG. 6A shows each displacement amount of a first piezoelectric element 14a and a second piezoelectric element 14b and the displacement amount (first vibration pattern) of the touch panel 12 when the drive signals (sine waves) in the same phase are applied to the first and second piezoelectric elements 14a and 14b. In this case, each displacement amount of the first and second piezoelectric elements 14a and 14b agrees with the displacement amount of the touch panel 12. Accordingly, in the first vibration pattern, a period during which the touch panel 12 is pressed up and a period during which the touch panel 12 is pressed down are alternately repeated for the same duration.

Figure 6B:
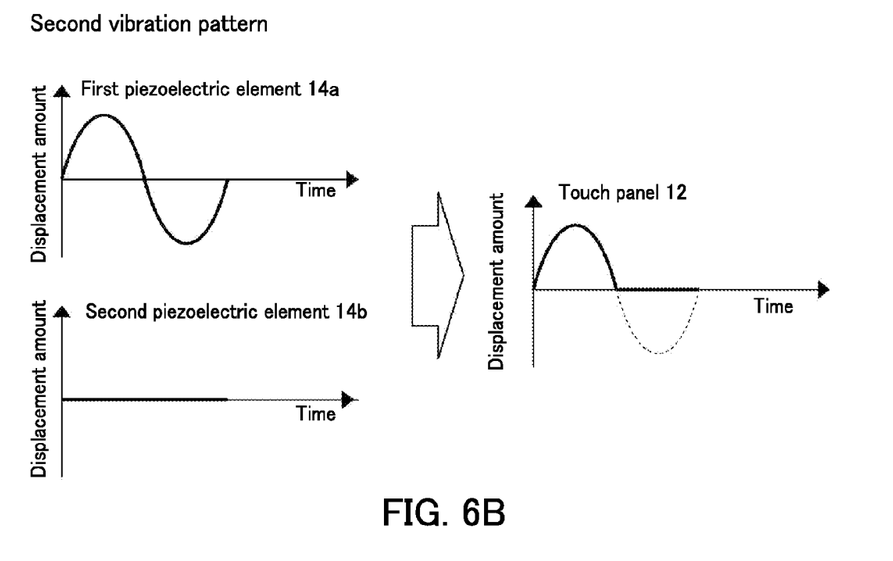
FIG. 6B is an illustration showing a second vibration pattern of the touch panel according to the embodiment.

FIG. 6B shows each displacement amount of the first piezoelectric element 14a and the second piezoelectric element 14b and the displacement amount (second vibration pattern) of the touch panel 12 when the drive signal (sine wave) is applied only to the first piezoelectric element 14a. In the second vibration pattern, the displacement amount of the first piezoelectric element 14a is synthesized with the displacement amount of the second piezoelectric element 14b, so that a period during which the touch panel 12 is pressed up is repeated intermittently.

Figure 7A:
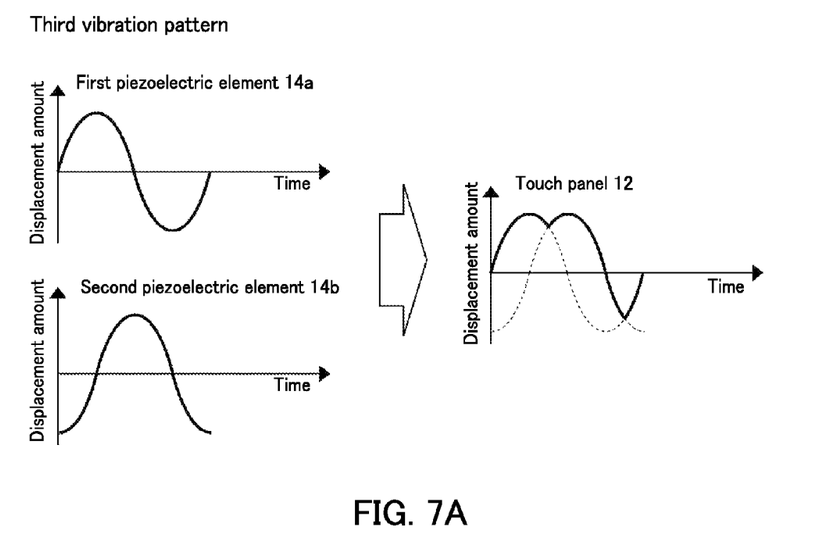
FIG. 7A is an illustration showing a third vibration pattern of the touch panel according to the embodiment.

FIG. 7A shows each displacement amount of the first piezoelectric element 14a and the second piezoelectric element 14b and the displacement amount (third vibration pattern) of the touch panel 12 when the drive signals (sine waves), of which phases are shifted by ¼ of the wavelength relative to each other, are applied to the first and second piezoelectric elements 14a and 14b. In the third vibration pattern, the displacement amount of the first piezoelectric element 14a is synthesized with the displacement amount of the second piezoelectric element 14b, so that a long period during which the touch panel 12 is pressed up and a short period during which the touch panel 12 is pressed down are alternately repeated.

Figure 7B:
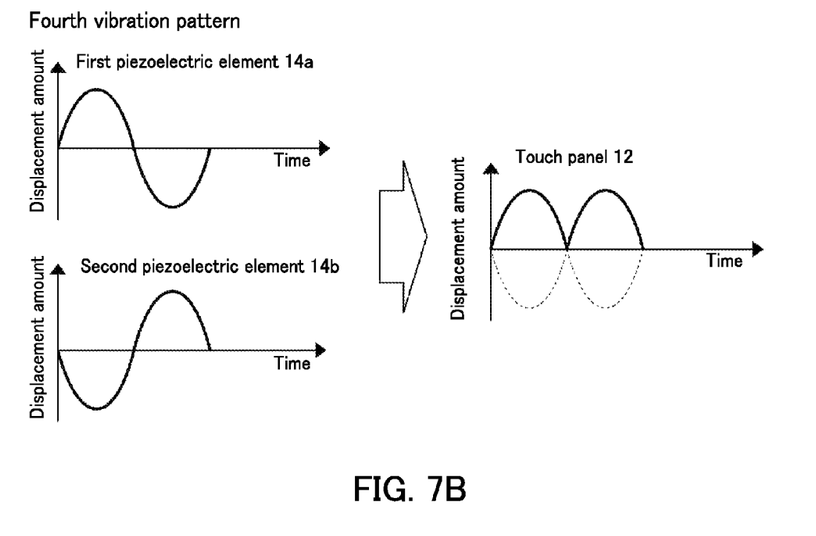
FIG. 7B is an illustration showing a fourth vibration pattern of the touch panel according to the embodiment.

FIG. 7B shows each displacement amount of the first piezoelectric element 14a and the second piezoelectric element 14b and the displacement amount (fourth vibration pattern) of the touch panel 12 when the drive signals (sine waves) in phases shifted by ½ of the wavelength relative to each other are applied to the first and second piezoelectric elements 14a and 14b. In the fourth vibration pattern, the displacement amount of the first piezoelectric element 14a is synthesized with the displacement amount of the second piezoelectric element 14b, so that a period during which the touch panel 12 is pressed up is repeated in series.

It is noted that the present embodiment describes one example in which the drive signals with the same wavelength and amplitude are used to displace the touch panel 12 in the direction perpendicular to the plane of the touch panel 12 according to the four vibration patterns. However, the present disclosure is not limited to the four vibration patterns. The phase shift of the drive signals applied to the first piezoelectric element 14a and the second piezoelectric element 14b can be appropriately changed to displace the touch panel 12 according to further more vibration patterns.

As described above, the touch panel device 10 according to the present embodiment includes the first piezoelectric elements 14a, the second piezoelectric elements 14b and the vibration drive controller 18. The first and second piezoelectric elements 14a and 14b are in contact with the reverse surface of the touch panel 12 at locations close to each other and displace the touch panel 12 in the direction perpendicular to the plane of the touch panel 12. The vibration drive controller 18 applies the drive signals to the first and second piezoelectric elements 14a and 14b to displace the touch panel 12 according to a plurality of vibration patterns. According to this configuration, when the drive signals with the same wavelength and amplitude are applied to both of the first piezoelectric element 14a and the second piezoelectric element 14b with or without their phases shifted, or the drive signal is applied to one of the first and second piezoelectric elements 14a and 14b in each pair, the touch panel 12 can be displaced in the direction perpendicular to the plane of the touch panel 12 according to the plurality of vibration patterns. Accordingly, tactile feeling to be fed back to an operator can be changed without a need of providing a complicated control circuit.

Further, in the present embodiment, the vibration drive controller 18 applies the drive signals in the same phase to the first piezoelectric element 14a and the second piezoelectric element 14b to displace the touch panel 12 according to the first vibration pattern, or applies the drive signal to one of the first piezoelectric element 14a and the second piezoelectric element 14b to displace the touch panel 12 according to a vibration pattern different from the first vibration pattern.

Furthermore, in the present embodiment, the vibration drive controller 18 applies the drive signals in the same phase to the first piezoelectric elements 14a and the second piezoelectric elements 14b to displace the touch panel 12 according to the first vibration pattern, or applies the drive signals in different phases to the first piezoelectric elements 14a and the second piezoelectric elements 14b to displace the touch panel 12 according to a vibration pattern different from the first vibration pattern.

It is noted that the present disclosure is not limited to the above described embodiment. The embodiment can be appropriately altered within the scope of technical idea of the present disclosure. Further, the number, position, shape, etc. of each of the above described members are not limited to those in the above described embodiment. Any number, position, shape, etc. suitable for practical use of the present disclosure can be employed. It is noted that like numerals denote like elements or corresponding elements in the drawings.

What is claimed is:

1. A touch panel device, comprising:
a touch panel;
at least one pair of a first displacement section and a second displacement section, the first displacement section not being fixed to a reverse surface of the touch panel and configured to come in contact with the reverse surface of the touch panel based on a first drive signal to displace the touch panel in a direction perpendicular to a plane of the touch panel, the second displacement section not being fixed to the reverse surface of the touch panel and configured to come in contact with the reverse surface of the touch panel at a location close to a location where the first displacement section is in contact with the reverse surface of the touch panel based on a second drive signal to displace the touch panel in the direction perpendicular to the plane of the touch panel; and
a vibration drive controller configured to generate a first drive signal to be applied to the first displacement section and a second drive signal to be applied to the second displacement section, wherein
the first and second drive signals are periodic signals having a same wavelength and amplitude,
the vibration drive controller causes displacement of the touch panel according to a vibration pattern selected from a plurality of vibration patterns, the plurality of vibration patterns including a first vibration pattern,
the vibration drive controller generates either one of the first and second drive signals to displace the touch panel according to the first vibration pattern that alternately creates a first state and a second state,
in the first state, only the first displacement section is in contact with the reverse surface of the touch panel while the second displacement section is separate from the reverse surface of the touch panel, and
in the second state, only the second displacement section is in contact with the reverse surface of the touch panel while the first displacement section is separate from the reverse surface of the touch panel.

2. A touch panel device according to claim 1, wherein the first displacement section and the second displacement section are piezoelectric elements.

3. A touch panel device according to claim 1, wherein
the plurality of vibration patterns further includes a second vibration pattern different from the first vibration pattern, and
the vibration drive controller generates the first drive signal, while generating the second drive signal having a phase different from that of the first drive signal to causes displacement of the touch panel according to the second vibration pattern that alternately creates the first state and the second state.

4. A touch panel device according to claim 1, wherein
the at least one pair of first and second displacement sections includes at least four pairs of first and second displacement sections,
the touch panel has a rectangular shape having four sides, and
the at least four pairs of first and second displacement sections are each displaced on a corresponding one of the four sides.

5. A touch panel device according to claim 1, wherein
the at least one pair of first and second displacement sections includes only four pairs of first and second displacement sections,
the touch panel has a rectangular shape having four sides, and
the four pairs of first and second displacement sections are each disposed on a corresponding one of the four sides.

6. A touch panel device according to claim 5, wherein
the four pair of first and second displacement sections are each disposed on a central part of a corresponding one of the four sides of the rectangular shape.

* * * * *